US009837073B2

(12) United States Patent
Kanthak et al.

(10) Patent No.: US 9,837,073 B2
(45) Date of Patent: Dec. 5, 2017

(54) EFFICIENT INCREMENTAL MODIFICATION OF OPTIMIZED FINITE-STATE TRANSDUCERS (FSTS) FOR USE IN SPEECH APPLICATIONS

(75) Inventors: Stephan Kanthak, Aachen (DE); Oliver Bender, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 106 days.

(21) Appl. No.: 14/346,331

(22) PCT Filed: Sep. 21, 2011

(86) PCT No.: PCT/US2011/052544
§ 371 (c)(1),
(2), (4) Date: Mar. 21, 2014

(87) PCT Pub. No.: WO2013/043165
PCT Pub. Date: Mar. 28, 2013

(65) Prior Publication Data
US 2014/0229177 A1    Aug. 14, 2014

(51) Int. Cl.
*G10L 15/00* (2013.01)
*G10L 15/08* (2006.01)

(52) U.S. Cl.
CPC ............ *G10L 15/08* (2013.01); *G10L 15/083* (2013.01)

(58) Field of Classification Search
USPC ........................................................ 704/236
See application file for complete search history.

(56) References Cited

U.S. PATENT DOCUMENTS 5,781,884 A * 7/1998 Pereira .................... G10L 13/08
704/257
6,424,983 B1 * 7/2002 Schabes ................ G06F 17/273
704/9
8,386,264 B2 * 2/2013 Hori .................. G06F 17/30746
704/257

(Continued)

FOREIGN PATENT DOCUMENTS

KR    10-2007-0053015        5/2007

OTHER PUBLICATIONS

International Search Report, PCT/US2011/052544, dated Feb. 7, 2012, 2 pages.

(Continued)

*Primary Examiner* — Kevin Ky
(74) *Attorney, Agent, or Firm* — Daly, Crowley, Mofford & Durkee, LLP (57) ABSTRACT

Methods of incrementally modifying a word-level finite state transducer (FST) are described for adding and removing sentences. A prefix subset of states and arcs in the FST is determined that matches a prefix portion of the sentence. A suffix subset of states and arcs in the FST is determined that matches a suffix portion of the sentence. A new sentence can then be added to the FST by appending a new sequence of states and arcs to the FST corresponding to a remainder of the sentence between the prefix and suffix. An existing sentence can be removed from the FST by removing any arcs and states between the prefix subset and the suffix subset. The resulting modified FST is locally efficient but does not satisfy global optimization criteria such as minimization.

14 Claims, 6 Drawing Sheets

(56) References Cited

U.S. PATENT DOCUMENTS

| | | | |
|---|---|---|---|
| 8,700,404 B1* | 4/2014 | Chotimongkol | G10L 15/1815 704/255 |
| 8,788,258 B1* | 7/2014 | Bangalore | G11B 27/105 704/2 |
| 8,972,243 B1* | 3/2015 | Strom | G10L 15/1815 704/1 |
| 2003/0046055 A1* | 3/2003 | Kempe | G06F 17/273 704/1 |
| 2004/0176945 A1* | 9/2004 | Inagaki et al. | 704/4 |
| 2005/0288928 A1 | 12/2005 | Bergl et al. | |
| 2007/0118353 A1 | 5/2007 | Cho et al. | 704/3 |
| 2007/0192104 A1* | 8/2007 | Blewett | G10L 15/28 704/256 |
| 2007/0265826 A1* | 11/2007 | Chen | G06F 17/2818 704/2 |
| 2008/0046229 A1 | 2/2008 | Maskey et al. | 704/2 |
| 2011/0153324 A1* | 6/2011 | Ballinger et al. | 704/235 |
| 2012/0046935 A1* | 2/2012 | Nagao | G06F 17/2775 704/8 |

OTHER PUBLICATIONS

Written Opinion of the International Searching Authority, PCT/US2011/052544, dated Feb. 7, 2012, 5 pages.
International Preliminary Report on Patentability, PCT/US2011/052544, dated Mar. 25, 2014, 1 page.
Japanese Notification of Reasons for Rejection (English Translation) dated Feb. 19, 2015; Japanese Pat. App. No. 2014-531767; 7 pages.
Aoe et al.; "An Algorithm of Compressing Common Suffixes for Trie Structures;" The Transactions of the Institute of Electronics, Information and Communication Engineers, Japan, The Institute of Electronics, Information and Communication Engineers vol. J75-D-II, No. 4; Apr. 25, 1992; pp. 770-779.
Hori et al.; "State-of-the-art Technology of Speech Information Processing: 3;" Speech Recognition Using Weighted Finite-State Transducers, Journal of Information Processing Society of Japan vol. 45 No. 10, Japan, International Processing Society of Japan; Oct. 2004; pp. 1020-1026.
Mochizuki et al.; "The Design and Implementation of a Substring Search in Extendible Hashing;" Transactions of Information Processing Society of Japan, Japan, Information Processing Society of Japan vol. 38, No. 2; Feb. 15, 1997; pp. 310-320.
Aoe et al.; "An Algorithm of Compressing Common Suffixes for Trie Structures;" The Transactions of the Institute of Electronics, Information and Communication Engineers, Japan, The Institute of Electronics, Information and Communication Engineers vol. J75-D-II, No. 4; Apr. 25, 1992; pp. 770-779, [with English machine translation].
Hori et al.; "State-of-the-art Technology of Speech Information Processing: 3;" Speech Recognition Using Weighted Finite-State Transducers, Journal of Information Processing Society of Japan vol. 45 No. 10, Japan, Informational Processing Society of Japan; Oct. 2004; pp. 1020-1026, [with English machine translation].
Mochizuki et al.; "The Design and Implementation of a Substring Search in Extendible Hashing;" Transactions of Information Processing Society of Japan, Japan, Information Processing Society of Japan vol. 38, No. 2; Feb. 15, 1997; pp. 310-320, [with English machine translation].
ISA/US, Commissioner of Patents, Officer Lee W. Young, International Search Report, Application No. PCT/US11/52544, dated Feb. 7, 2012, 2 pages.
Supplementary European Search Report dated Mar. 6, 2015, PCT/US2011052544, 7 pages.
Letter from NPA International dated Oct. 20, 2015; for Chinese Pat. App. No. 201180074721.1; 1 page.
Office Action with English translation dated Oct. 10, 2015; for Chinese Pat. App. No. 201180074721.1; 13 pages.
Chinese Application No. 201180074721.1 Response dated Dec. 23, 2015 including translated claim amendments 13 pages.
Japanese Patent Application No. 2014-531767 Examiner's Amendment with English translation of Allowed Claims dated Jul. 26, 2016, 4 pages.
Japanese Patent Application No. 2014-531767 Notice of Allowance dated Jul. 28, 2016, 3 pages.
Chinese Application No. 201180074721.1 Notice of Grant dated Jul. 7, 2016, including English translation, 4 pages.
Chinese Patent Application No. 201180074721.1 Office Action dated Mar. 1, 2016, including letter from foreign associate translating examiner's objections and translated amended claims, 7 pages.
Chinese Patent Application No. 201180074721l Response to Office Action, including English translation of amended claims, filed on Mar. 11, 2016, 8 pages.
Korean Notice of Preliminary Rejection (with English translation) dated May 26, 2017; for Korean Pat. App. No. 10-2014-7010464; 8 pages.
Response to Korean Office Action dated May 26, 2017 (with machine English translation downloaded from Espace.net on Aug. 11, 2017) for Korean Application No. 10-2014-7010464; Response Filed Jul. 26, 2017; 28 Pages.
European Examination Report dated Jul. 20, 2017 for European Application No. 11872688.4-1901; 4 Pages.

* cited by examiner

*Fig. 7*

EFFICIENT INCREMENTAL MODIFICATION OF OPTIMIZED FINITE-STATE TRANSDUCERS (FSTS) FOR USE IN SPEECH APPLICATIONS

TECHNICAL FIELD

The present invention relates to speech processing applications, and more specifically to precompiled search networks as used in speech processing applications such as automatic speech recognition systems and text-to-speech systems.

BACKGROUND ART

Speech recognition systems try to determine the semantic meaning of a speech input. Typically, probabilistic finite state speech models are used to determine a sequence of words that best corresponds to the speech input. One common example is an automotive application which allows control of applications within the passenger cabin such as navigational systems, audio, systems, climate control, etc. The recognition task in such an application represents a combination of predetermined elements such as user commands and lists of streets in a city, along with dynamically determined elements such as lists of mp3 songs, names from a personal digitized address book (e.g., from a smartphone), and navigational points of interest. For such applications, it is desirable to have compact memory efficient search networks with fast low latency performance.

Figure 1:
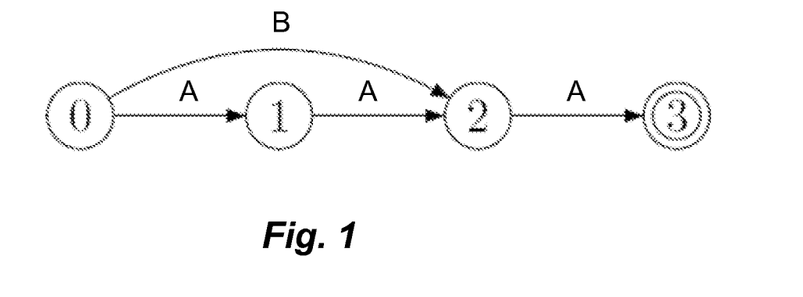
FIG. 1 shows a simple example of one specific FST.

The recognition task includes multiple different knowledge levels, from the acoustic forms of fundamental speech sounds known as phonemes, to the phoneme sequences that form words in a recognition vocabulary, to the word sequences that form phrases in a recognition grammar. One powerful and convenient way to organize the recognition task is based on the use of finite state machines such as finite state acceptors (FSA) and finite state transducers (FST). For convenience, the following discussion uses the term FST, though not in any particularly rigorous sense but rather in a generic inclusive way that also applies in many respects to FSAs and other specific forms of finite state machines. FIG. 1 shows a specific example of one simple FST that parses a set of word level symbols: {AAA, BA, AAB}; see e.g., Jurafsky & Martin, *Speech and Language Processing*, Prentice Hall 2001. pp. 33-83. ISBN 0-13-095069-6; which is incorporated herein by reference.

Implementing speech processing applications on mobile platforms such as smartphones is especially challenging in view of the limited resources that are available. Some optimizations may be implemented to improve speed, accuracy, and/or use of limited memory. Among other things, FSTs allow for a single unified representation of acoustic information (HMM set), word pronunciations, language model, and recognition grammar. Due to this unified representation, computationally inexpensive computations can be performed during traversal of the search network while other computationally expensive optimizations can be offloaded to a precompilation stage. The four most widely used optimizations for static compilation of FSTs include determinization, minimization, weight and label pushing; see e.g., Mohri, *Minimization of Sequential Transducers*, (5th Annual Symposium on Combinatorial Pattern Matching 1994); incorporated herein by reference.

Despite determinization, existing FST optimizations are global, i.e. they need to access a FST as a whole and therefore can't be applied in speech applications that incrementally modify the search network. Some theoretical aspects of incrementally adding sentences to a word-level FST are described more fully in Crochemore and Giambruno, *On-Line Construction Of A Small Automaton For A Finite Set Of Words*, The Prague Stringology Conference 2009; incorporated herein by reference.

SUMMARY

Embodiments of the present invention are directed to methods of incrementally modifying a word-level finite state transducer (FST) for adding and removing sentences. A prefix subset of states and arcs in the FST is determined that matches a prefix portion of the sentence. A suffix subset of states and arcs in the FST is determined that matches a suffix portion of the sentence. A new sentence can then be added to the FST by appending a new sequence of states and arcs to the FST corresponding to a remainder of the sentence between the prefix and suffix. An existing sentence can be removed from the FST by removing any arcs and states between the prefix subset and the suffix subset. The resulting modified FST is locally efficient but does not satisfy global optimization criteria such as minimization.

The FST may be a speech application FST and the sentence may be dynamically added or removed from the FST during online operation of the speech application. To remove an existing sentence, the steps may be repeated one or more times in a partial match process ("fuzzy removal") to remove multiple instances of the existing sentence from the FST. A hash table may be used for determining the prefix subset and/or the suffix subset, for example, a special dual-use hash table. The global optimization criteria may include FST minimization criteria.

BRIEF DESCRIPTION OF THE DRAWINGS

FIG. 2 A-C shows an example of adding a sentence to an FST according to one embodiment of the present invention.

FIG. 3 A-C shows an example of adding a new state to an existing FST for shared suffixes.

FIG. 4 A-B shows an example of the global non-minimality of the FST.

FIG. 5 A-B shows an example of removing a sentence from an existing FST using an exact match process.

FIG. 6 A-B shows an example of a partial match process for removing a sentence from an existing FST.

DETAILED DESCRIPTION

Various embodiments of the present invention are directed to techniques for to efficiently allow for dynamic modifications of FSTs using local optimizations slightly weaker than global optimizations; for example, adding and removing of sentences to a word-level FST based on incremental local minimization. The property of local minimization is a weaker version of minimization that only applies to suffix paths on which all states have a fan-out of not more than 1 arc. Given a sentence of length N, embodiments of the present invention add to/remove from an FST based on an amortized complexity of O(N), i.e., it takes not more than c*N steps with c being constant to the implementation, but not $N^2$ steps. This can be used to incrementally compose FSTs that decode speech into text almost as efficient as globally optimized FSTs and also help reduce memory consumption for (offline) static compilation of FSTs. Although the following discussion is presented in terms of a speech recognition application, the ideas can be extended to any application that needs to incrementally build time or space efficient FSTs such as text-to-speech, text processing, etc.

Figure 2:
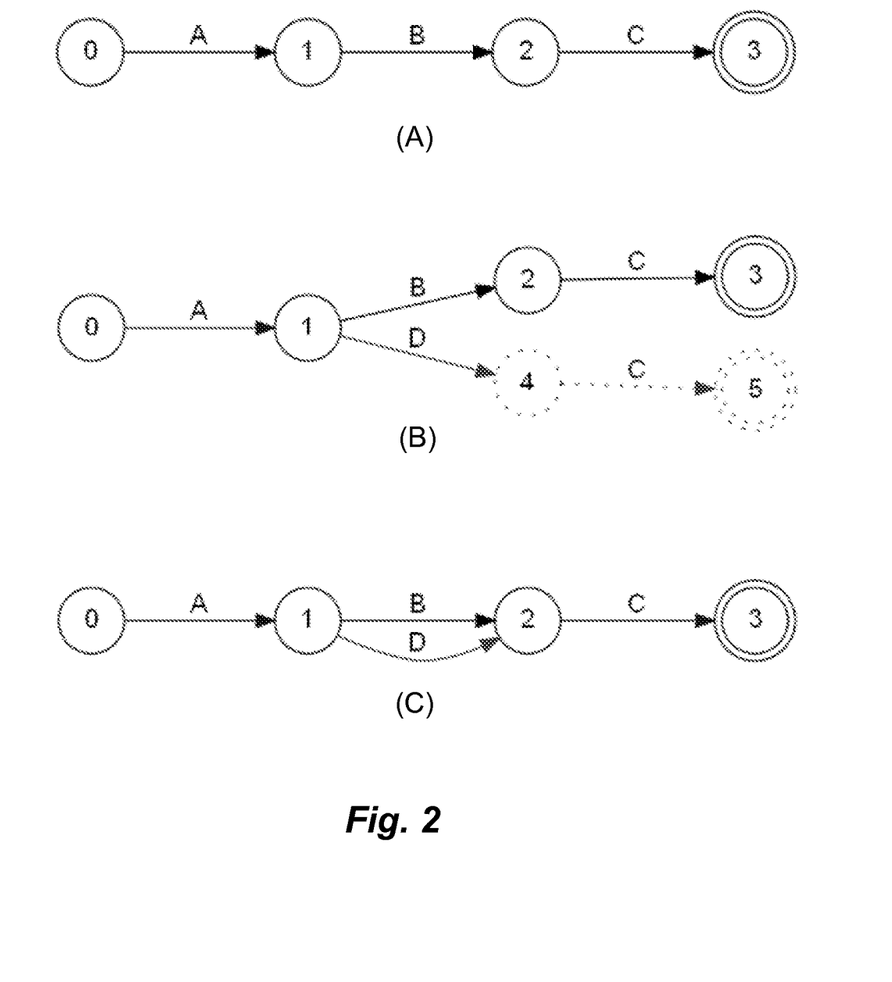

FIG. 2 A-C shows an example of adding a sentence to an FST according to one embodiment of the present invention with linear time complexity based on sharing a prefix and suffix of the new sentence with those already present in the existing FST. (NB: Again as explained above, the formal distinction between FSA and FST is actually rather trivial in this context, where the input/output arc label pairs from an FST are given a single label to simplify the figures). FIG. 2A shows a simple existing word-level FST for the sentence ABC. To add a new sentence ADC to this FST, first a prefix subset of states and arcs in the FST is determined that matches a prefix portion of the new sentence. In this specific case, the existing prefix subset for adding the new sentence ADC would be determined to be the existing states 0 and 1 and their connecting arc A, FIG. 2B. Next a suffix subset of states and arcs in the FST is determined that matches a suffix portion of the new sentence. In the case of the new sentence ADC, the suffix subset would be the existing states 2 and 3 and their connecting arc C. The new sentence can then be added to the FST by appending a new sequence of states and arcs to the FST corresponding to a remainder of the sentence between the prefix and suffix. In the case of adding ADC, this can be done by adding the arc D between states 1 and 2, FIG. 2C.

The resulting modified FST is locally efficient in that only non-existing states/arcs are added, but it does not satisfy global optimization criteria such as minimization. Instead it satisfies at least the weaker incremental minimization. A hash table may be used for determining the prefix subset and/or the suffix subset. For example, a prefix hash table of O(1) linear time complexity can be used such that: f(state, arc label)→target state, thereby ensuring that overall complexity will be no worse than O(N). And it is not important in what specific order the various steps are performed.

Figure 3:
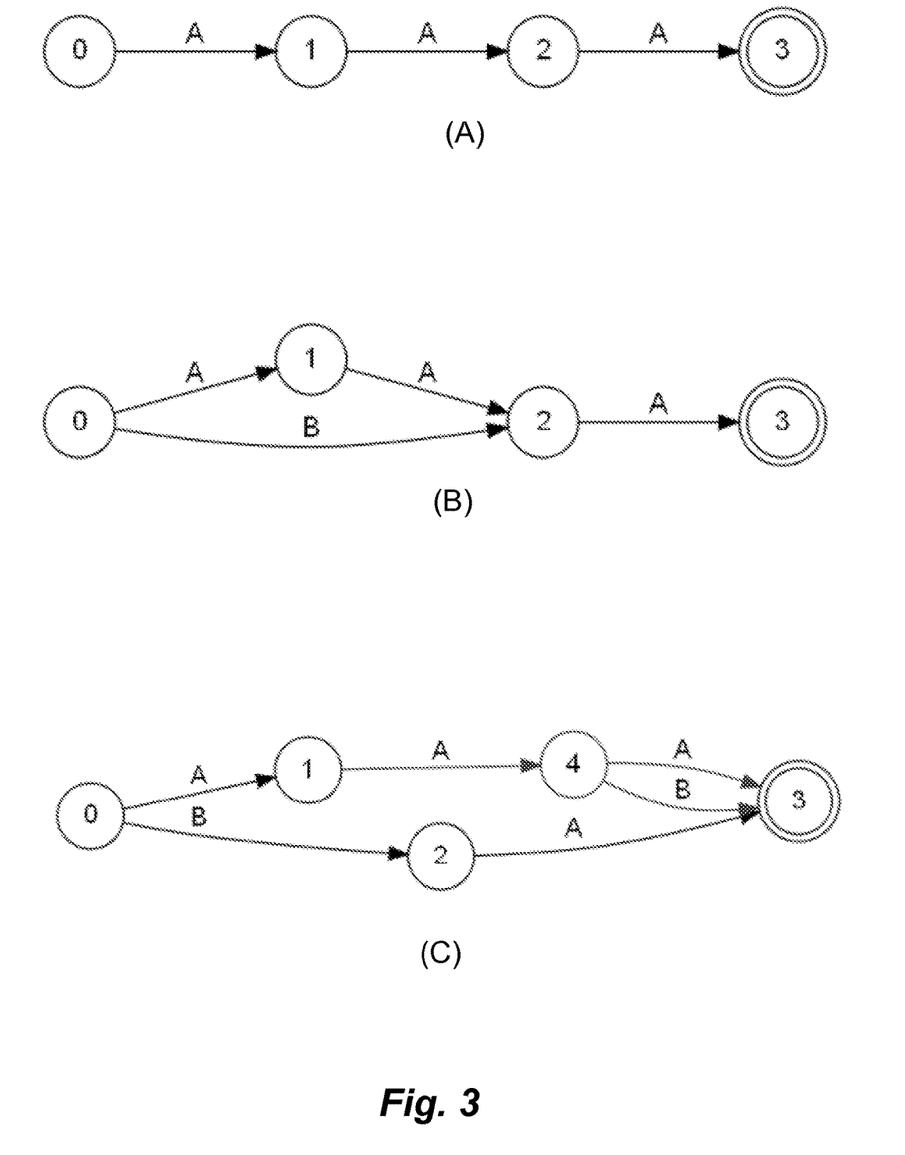

FIG. 3 A-C shows another example of adding a new state to an existing FST for shared suffixes. FIG. 3A shows an existing FST for the sentence AAA. To add a new sentence BA, the suffix A can be shared by using state 2 and adding the new arc B from state 0 to state 2, FIG. 3B. To then add another new sentence AAB, a new state 4 is added that receives the prefix subset AA, the existing arc A from state 2 to state 3 is replicated from state 4 to state 3 (parsing existing sentence AAA) and a new arc 4B3 is added to complete the new path AAB, FIG. 3C.

Figure 4:
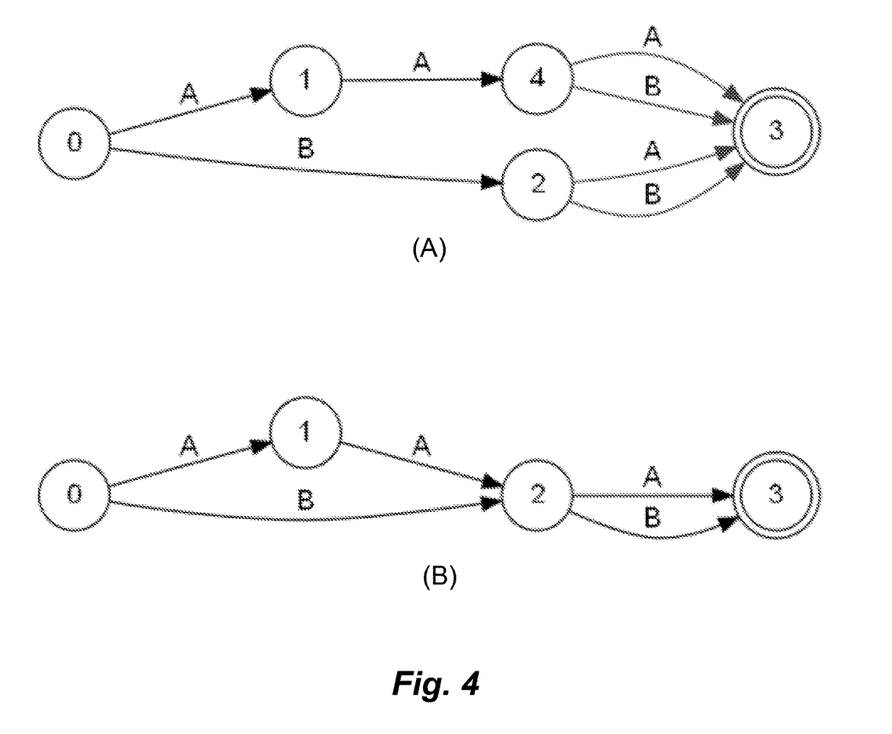

While such an approach will be locally efficient, at some point, the growing FST becomes globally non-minimal. For example, if the modified FST in FIG. 3C then has another new sentence added, BB, the existing B prefix will be identified and a new arc B added from state 2 to state 3, FIG. 4A. But this new FST is not globally minimized because state 4 is not longer required and could be removed as shown in FIG. 4B which still correctly parses all and only AAA, BA, AAB, and BB. But the ease of the process outweighs the small incremental loss of global non-minimality.

In addition to adding sentences to an existing FST, an existing sentence also can be removed from the FST by removing any arcs and states between the prefix subset and the suffix subset; e.g. by a "free" list for later use. A hash table may be useful in connection with such a removal process, for example, a prefix hash table can quickly access start states of potential matches. So: p→O(p) accesses to a hash table that matches input label p. Only obsolete arcs need to be removed.

Figure 5:
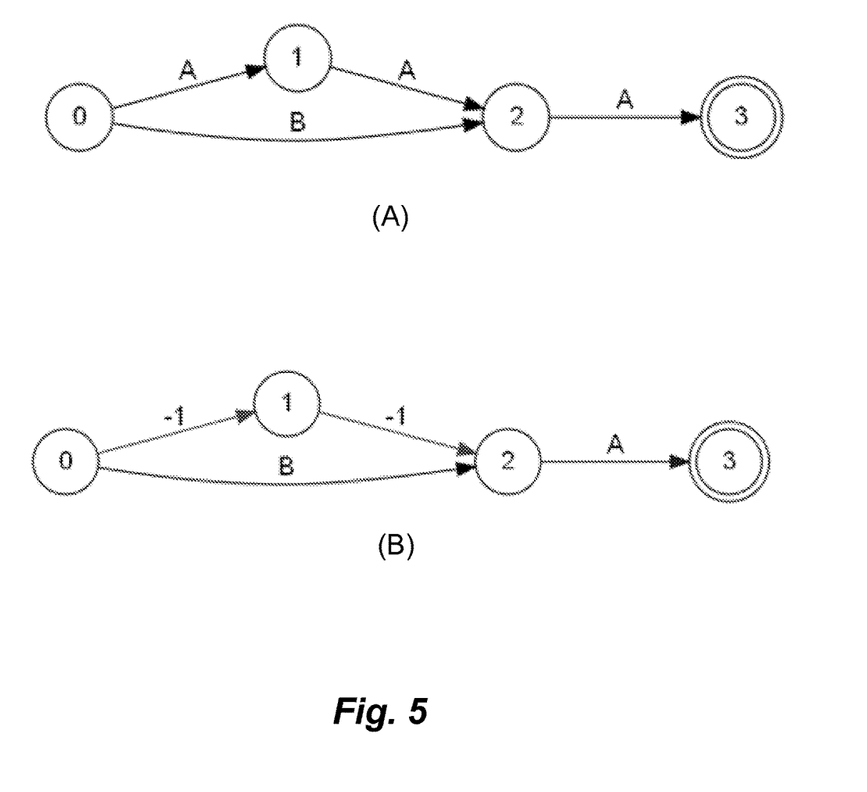

One specific process for removing a sentence from an existing FST may be based on an exact match approach as shown in FIG. 5 A-B. FIG. 5A shows an existing FST that parses the sentences AAA and BA. To remove a sentence, any remaining prefixes and/or suffixes first must be determined and retained. For example, to remove the sentence AAA (and retain BA), there is no prefix to retain, but the A suffix of BA is identified and retained, so the suffix subset (2, A, 3) is retained (that is, states 2 and 3 and arc (edge) A between them:

$$2 \xrightarrow{A} 3),$$

while the remainder of the path for AA is removed: state 1 and the arcs $$0 \xrightarrow{A} 1 \text{ and } 1 \xrightarrow{A} 2$$

(the (−1) as shown in FIG. 5B).

Figure 6:
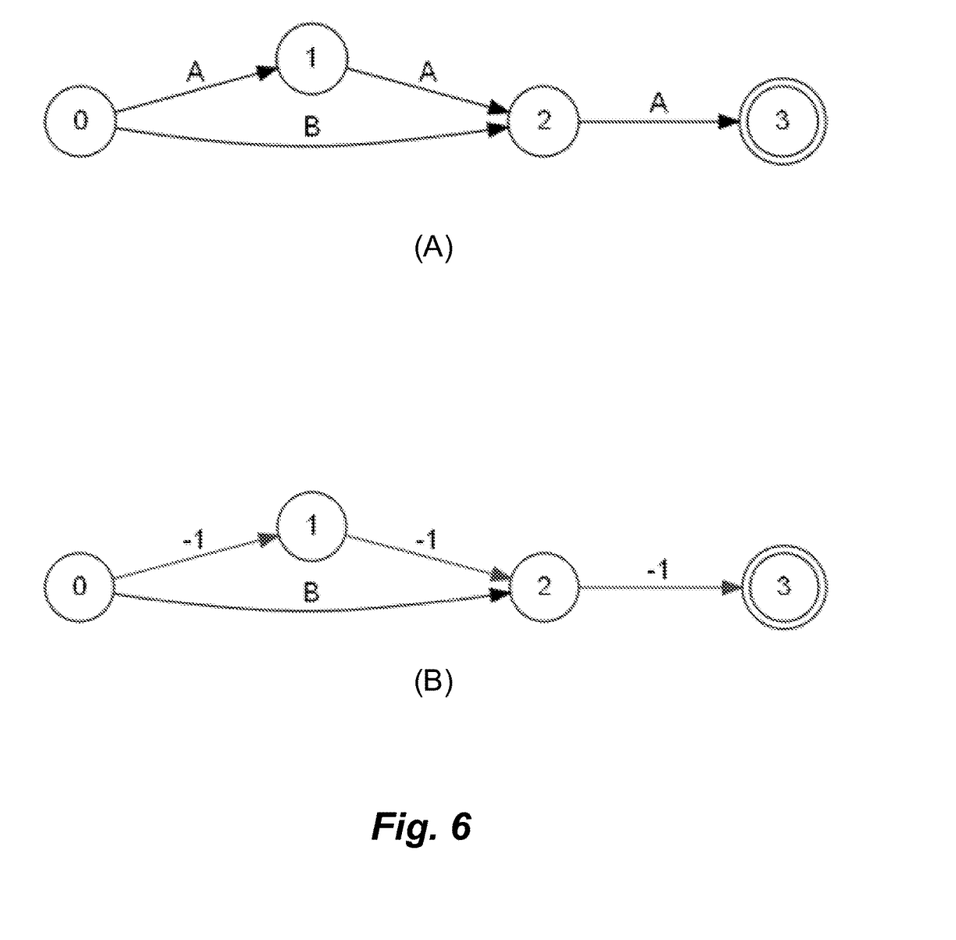

The arc/state removal steps may be repeated one or more times (e.g., testing for repetition may be based on inspecting collisions in the hash table) in a partial match process to remove multiple instances of an existing sentence or sentence fragment from an FST. For example, FIG. 6A shows an existing FST like that in FIG. 5A that parses the sentences AAA and BA. To remove an existing partial sentence, *A*, the first instance is found in the arc $$0 \xrightarrow{A} 1$$

which is removed (−1), then method repeats, next removing the arc $$1 \xrightarrow{A} 2,$$

and then the arc $$2 \xrightarrow{A} 3$$

until all instants of the partial sentence *A* have been identified and removed, FIG. 6B. Again a hash table may be useful for the implementation, e.g., using a modified prefix hash function "f(arc label)→target state". Such a partial match approach could greatly increase the number of collisions so that sentence addition might no longer be efficient enough. It might be helpful to use a carefully chosen hash function and group accesses (add, remove) such that the resulting data structure only differs by hash function.

Figure 7:
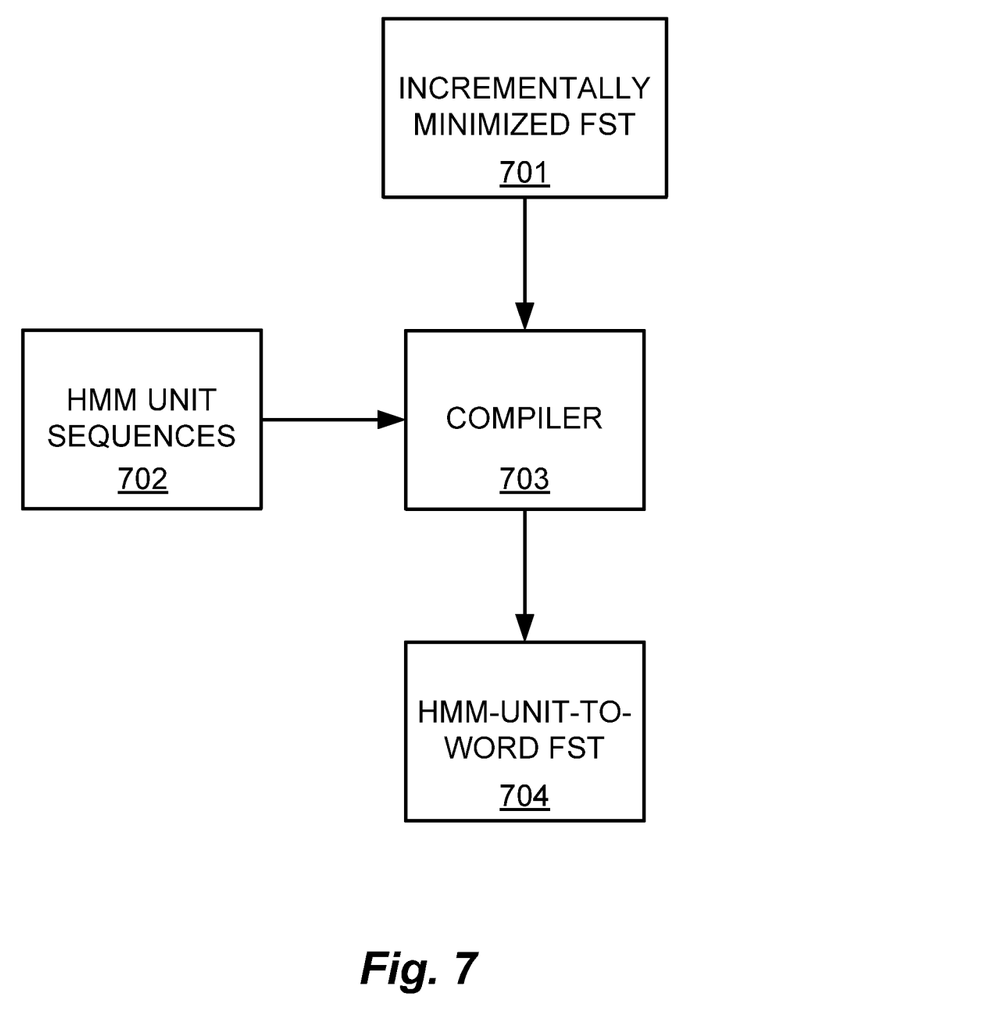
FIG. 7 shows a basic architecture for an embodiment of a system using a modified FST arrangement according to one embodiment of the present invention.

FIG. 7 shows a basic architecture for an embodiment of a system using a modified FST arrangement according to one embodiment of the present invention, in this case a speech application FST which dynamically adds and remove sentences during online operation of the speech application, that is, the system can be modified at run time. Compiler 703 performs a run time expansion of the incrementally minimized word-level FST 701 (i.e., the language model) with the HMM unit sequences 702 (i.e., the acoustic models) to create a HMM-unit-to-word FST 704 (on which the compiler 703 also does determinization and local minimization) for speech recognition of unknown speech inputs in a speech application. And while the HMM-unit-to-word FST 704 is incrementally constructed as described above (i.e., during recognition) rather than strictly globally minimized, it still is compact and efficient enough to be beneficial for commercial use and additional computations are avoided. In some embodiments, run time expansion may be an optional step that may or may not be performed. The HMM-unit-to-word FST can also be directly constructed using incremental minimization. However, due to various factors such as lengthy pronunciations (and the same may be used more than once) this approach may require more overhead for the additional/removal steps. Thus, specific embodiments may for that reason choose to dynamically expand the transcriptions during recognition.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, electrically erasable ROM like "Flash ROM", or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method of speech recognition by adding a new sentence to a word-level finite state transducer (FST) having a plurality of states and connecting arcs, the method comprising:
   determining, using a computer processor, an existing prefix subset of states and arcs in the FST matching a prefix portion of the new sentence;
   appending a new sequence of states and arcs to the FST corresponding to a remainder of the new sentence after the prefix portion;
   determining an existing suffix subset of states and arcs in the FST corresponding to a suffix portion of the new sentence;
   connecting the portion of the new sequence before the suffix portion to the suffix subset to create a modified FST including the new sentence and not satisfying global optimization criteria; and
   storing the modified FST in memory and dynamically expanding the modified FST using a computer configured as a compiler and using the modified FST for speech recognition, text-to-speech, and/or text processing.

2. A method according to claim 1, wherein the FST is a speech application FST.

3. A method according to claim 2, wherein the new sentence is dynamically added to the FST during online operation of the speech application.

4. A method according to claim 2, wherein the new sentence is added the FST during an offline compilation process.

5. A method according to claim 2, further comprising: dynamically expanding the modified FST for use in a speech application.

6. A method according to claim 1, wherein a hash table is used for determining the prefix subset.

7. A method according to claim 1, wherein a hash table is used for determining the suffix subset.

8. A computer-implemented method of speech recognition by removing an existing sentence from a word-level finite state transducer (FST) having a plurality of states and connecting arcs, the method comprising:
   determining, using a processor, a prefix subset of states and arcs in the FST matching a prefix portion of the existing sentence and corresponding to at least one other sentence of the FST;
   determining a suffix subset of states and arcs in the FST matching a suffix portion of the existing sentence and corresponding to at least one other sentence of the FST;
   removing from the FST any arcs and states between the prefix subset and the suffix subset to create a modified FST without the existing sentence and not satisfying global optimization criteria; and
   storing the modified FST in memory and dynamically modifying the modified FST using a computer configured as a compiler and using the modified FST for speech recognition, text-to-speech, and/or text processing.

9. A method according to claim 8, wherein the FST is a speech application FST.

10. A method according to claim 9, wherein the existing sentence is dynamically removed from the FST during online operation of the speech application.

11. A method according to claim 9, further comprising: dynamically expanding the modified FST for use in a speech application.

12. A method according to claim 8, further comprising a partial match process to remove a plurality of instances of the existing sentence from the FST.

13. A method according to claim 8, wherein a hash table is used for determining the prefix subset.

14. A method according to claim 8, wherein a hash table is used for determining the suffix subset.

* * * * *